(12) United States Patent
Bergman et al.

(10) Patent No.: US 9,730,123 B2
(45) Date of Patent: Aug. 8, 2017

(54) DETERMINING ROOT SEQUENCE

(75) Inventors: Petter Bergman, Ljungsbro (SE);
Stefan Engström, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 284 days.

(21) Appl. No.: 14/239,615

(22) PCT Filed: Aug. 22, 2011

(86) PCT No.: PCT/SE2011/051003
§ 371 (c)(1),
(2), (4) Date: Feb. 19, 2014

(87) PCT Pub. No.: WO2013/028107
PCT Pub. Date: Feb. 28, 2013

(65) Prior Publication Data
US 2014/0211606 A1    Jul. 31, 2014

(51) Int. Cl.
*H04W 36/08* (2009.01)
*H04W 16/10* (2009.01)
*H04W 74/00* (2009.01)
*H04W 92/20* (2009.01)

(52) U.S. Cl.
CPC ........... *H04W 36/08* (2013.01); *H04W 16/10* (2013.01); *H04W 74/004* (2013.01); *H04W 92/20* (2013.01)

(58) Field of Classification Search
None
See application file for complete search history.

(56) References Cited

U.S. PATENT DOCUMENTS

| 2007/0129080 A1 | 6/2007 | Okuda et al. |
| 2008/0316961 A1 | 12/2008 | Bertrand et al. |
| 2011/0002255 A1* | 1/2011 | Dharmaraju ........ H04L 12/1881 370/312 |

(Continued)

FOREIGN PATENT DOCUMENTS

| WO | 2009055627 A1 | 4/2009 |
| WO | 2010071561 A1 | 6/2010 |
| WO | 2010104977 A1 | 9/2010 |

OTHER PUBLICATIONS

Amarijoo et al—Automatic Planning and Handling of Random Acces Root Sequences—WO2010/071561.*

(Continued)

*Primary Examiner* — Kevin C Harper
*Assistant Examiner* — Derrick V Rose
(74) *Attorney, Agent, or Firm* — Coats & Bennett, PLLC

(57) ABSTRACT

It is presented a method, executed in a root sequence determiner for a base station controlling a first cell, the first cell being associated with at least one root sequence used for cell differentiation on a random access channel. The method comprises the steps of: obtaining information on root sequences of neighboring cells; when a root sequence conflict is found between the first cell and a neighboring cell, here denoted a conflict cell, determining if the conflict cell is of a higher priority than the first cell, the priorities of the first cell and the conflict cell being based on properties of the respective cells; and when the conflict cell is of a higher priority than the first cell, finding a new root sequence for the first cell, avoiding the root sequences of the neighboring cells.

23 Claims, 3 Drawing Sheets

(56) References Cited

U.S. PATENT DOCUMENTS

| | | | |
|---|---|---|---|
| 2011/0092235 A1* | 4/2011 | Chang | H04B 17/336 |
| | | | 455/507 |
| 2012/0294185 A1* | 11/2012 | Queseth | H04W 74/008 |
| | | | 370/252 |
| 2013/0294427 A1* | 11/2013 | Kim | H04W 16/14 |
| | | | 370/338 |

OTHER PUBLICATIONS

3rd Generation Partnership Project, "3rd Generation Partnership Project; Technical Specification Group Radio Access Network; Evolved Universal Terrestrial Radio Access (E-UTRA); Physical Channels and Modulation (Release 10)", Technical Specification, 3GPP TS 36.211 V10.2.0, Jun. 1, 2011, pp. 1-103, 3GPP, France.

3rd Generation Partnership Project, "3rd Generation Partnership Project; Technical Specification Group Radio Access Network; Evolved Universal Terrestrial Radio Access Network (E-UTRAN); X2 application protocol (X2AP) (Release 10)", Technical Specification, 3GPP TS 36.423 V10.2.0, Jun. 1, 2011, pp. 1-130, 3GPP, France.

3rd Generation Partnership Project, "3rd Generation Partnership Project; Technical Specification Group Radio Access Network; Evolved Universal Terrestrial Radio Access (E-UTRA); Radio Resource Control (RRC); Protocol specification (Release 10)", Technical Specification, 3GPP TS 36.331 V10.2.0, Jun. 1, 2011, pp. 1-294, 3GPP, France.

\* cited by examiner

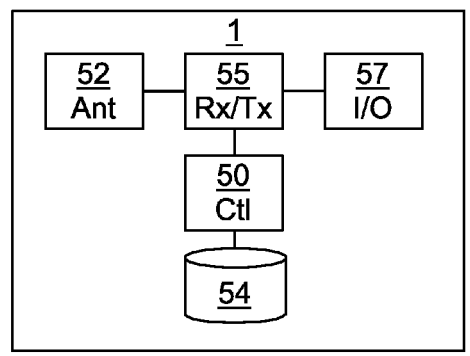
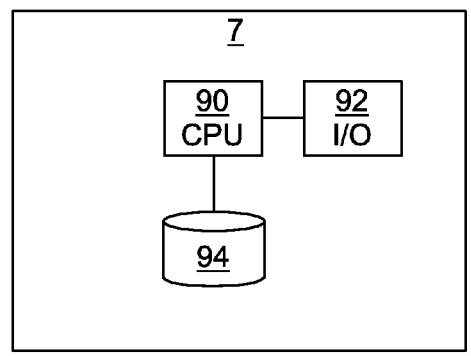
Fig. 5　　　　　　　　　Fig. 6
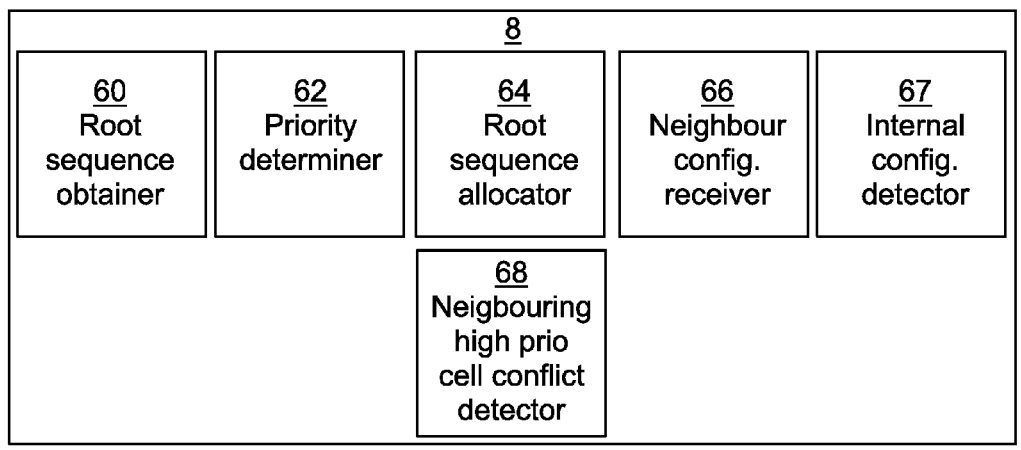
Fig. 7
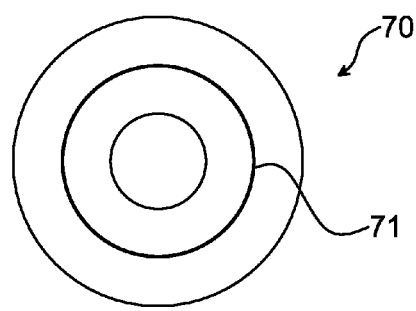
Fig. 8

DETERMINING ROOT SEQUENCE

TECHNICAL FIELD

The invention relates to improving allocation of parameters for random access to base stations in mobile communication system.

BACKGROUND

In mobile communication networks, such as LTE (Long Term evolution), random access channels are used by mobile communication terminals to initiate communication with a base station using a cell of the base station. The mobile communication terminal initiates this by sending a preamble, consisting of a number of symbols, on the random access channel (which is common to all such initiation for the cell) with a preamble id (RAPID, Random Access Preamble ID), for LTE between 0 and 63, selected from a group of preambles which are valid for the cell of the base station. In LTE, for the same cell, the valid preambles make use of a finite set of symbol sequences (root sequences). Different preambles are obtained from the same symbol sequence by cyclically shifting the symbols of the sequence.

If two neighbouring cells use the same root sequences for random access, this will cause unnecessary random access load. For each random access procedure in one cell there is a risk that a false preamble is detected in the other. As the number of preambles that can be handled simultaneously in one cell is limited, this will affect random access performance, e.g. by increasing the average delay before the mobile communication terminal establishes communication with the cell, and can also increase the risk of signalling congestion.

In WO 2010/071561 root sequence conflicts are detected and trigger reconfiguration of the used root sequences of the processing base station, neighbouring base stations and optionally of the base stations neighbouring the neighbouring base stations. However, the presented solution requires new communication between base stations and it is not trivial to resolve conflicts in root sequence usage between multilevel neighbours.

SUMMARY

According to a first aspect, it is presented a method, executed in a root sequence determiner for a base station controlling a first cell, the first cell being associated with at least one root sequence used for cell differentiation on a random access channel. The method comprises the steps of: obtaining information on root sequences of neighbouring cells, the neighbouring cells neighbouring the first cell; when a root sequence conflict is found between the first cell and a neighbouring cell, here denoted a conflict cell, determining if the conflict cell is of a higher priority than the first cell, the priorities of the first cell and the conflict cell being based on properties of the respective cells; and when the conflict cell is of a higher priority than the first cell, finding a new root sequence for the first cell, avoiding the root sequences of the neighbouring cells.

Using priorities to determine which cell should alter its root sequence usage provides a decisive and conclusive way to resolve conflicts. Moreover, even if conflicts are completely unavoidable, the lower priority cell is reconfigured according to best effort and such a situation is at least predictable. The presented method allows for an automatic reconfiguration, e.g. when new cells are added or the root sequence usage of existing cells is altered. Using priorities, oscillation of root sequence usage is avoided as each node in the system knows which node is to alter its root sequence usage. Moreover, no new non-standard messages between base stations are required.

A root sequence conflict may be present when any overlap exists between the at least one root sequence of the first cell and root sequences of the neighbouring cells to be used on overlapping frequencies.

In the step of determining if the conflict cell is of a higher priority than the first cell, a high speed cell may be of higher priority than a normal speed cell. High speed cells have greater restrictions on what root sequences can be used and are in this way given a higher probability of being allowed to keep its root sequence usage.

In the step of determining if the conflict cell is of a higher priority than the first cell, when priority between the first cell and the conflict cell is otherwise undetermined, a cell having assumed a high speed configuration earlier may be of higher priority than a cell having assumed a high speed configuration later. By making cells with a more recent configuration change its root sequence usage, stability for older configuration is preserved in these cases.

In the step of determining if the conflict cell is of a higher priority than the first cell, when priority between the first cell and the conflict cell is otherwise undetermined, a cell with a higher value of cyclic shift between valid preambles may be of higher priority than a cell with a lower value of cyclic shift between valid preambles. Higher values of cyclic shift can imply the use of more consecutive root sequences. Hence, it is in these cases easier for a cell using a lower value of cyclic shift to find a new root sequence configuration.

In the step of determining if the conflict cell is of a higher priority than the first cell, when priority between the first cell and the conflict cell is otherwise undetermined, a cell having assumed a value of cyclic shift between valid preambles earlier may be of higher priority than a cell having assumed a value of cyclic shift between valid preambles later.

In the step of determining if the conflict cell is of a higher priority than the first cell, when priority between the first cell and the conflict cell is otherwise undetermined, respective cell identifier values may be used to determine which one of the first cell and the conflict cell is of higher priority. This provides an unambiguous way to decide which one of two cells is of a higher priority.

The method may further comprise the step, prior to the step of obtaining root sequences, of: receiving a message indicating a modified configuration of any neighbouring cell.

The method may further comprise the step, prior to the step of obtaining root sequences, of: detecting a modified configuration of the first cell.

The method may further comprise the step of: when a new root sequence has been found for the first cell, sending a message indicating the new root sequence for the first cell to neighbouring base stations that are controlling the neighbouring cells.

The method may further comprise the step, prior to the step of finding a new root sequence, of: when it is determined that two neighbouring cells both are of a higher priority than the first cell and there is a root sequence conflict between two neighbouring cells, waiting a predetermined duration until the step of finding of a new root sequence is performed. In other words, the neighbouring higher priority cells can set their root sequence usage first to prevent multiple reconfigurations of the first cell.

The method may further comprise the step, prior to the step of finding a new root sequence, of: when it is determined that two neighbouring cells both are of a higher priority than the first cell and there is a root sequence conflict between two neighbouring cells, waiting until a message is received indicating that one of the two neighbouring cells has found a new root sequence.

The method may be executed for a plurality of cells of the base station, and in the step of finding a new root sequence for the first cell, any root sequence of other cells of the base station may be avoided.

The method may be executed in the base station.

The method may be executed in a server for a plurality of base stations.

A second aspect is a root sequence determiner arranged to determine a root sequence for a first cell controlled by processed base station, the root sequence being used for cell differentiation on a random access channel. The root sequence determiner comprises: a root sequence obtainer arranged to obtain root sequences of neighbouring cells, the neighbouring cells neighbouring the first cell; a priority determiner arranged to, when a root sequence conflict is found between the first cell and a neighbouring cell, called a conflict cell, determine if the conflict cell is of a higher priority than the first cell; and a root sequence allocator arranged to, when the conflict cell is of a higher priority than the first cell, find a new root sequence for the first cell, avoiding any root sequences of the conflict cell.

The base station may be the processed base station of the root sequence determiner.

A third aspect is a server comprising a root sequence determiner according to the second aspect, wherein the root sequence determiner is arranged to determine root sequences for a plurality of respective processed base stations of a mobile communication network.

A fourth aspect is a computer program for determining a root sequence in a root sequence determiner for a base station controlling a first cell, the first cell being associated with at least one root sequence used for cell differentiation on a random access channel. The computer program comprises computer program code which, when run on a root sequence determiner, causes the root sequence determiner to: obtain information on root sequences with neighbouring cells to the base station, the neighbouring cells neighbouring the first cell; when a root sequence conflict is found between the first cell and a neighbouring cell, here denoted a conflict cell, determine if the conflict cell is of a higher priority than the first cell, the priorities of the first cell and the conflict cell being based on properties of the respective cells; and when the conflict cell is of a higher priority than the first cell, find a new root sequence for the first cell, avoiding the root sequences of the neighbouring cells.

A fifth aspect is a computer program product comprising a computer program according to the fourth aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIG. 5 is a schematic diagram showing some components of the base station of FIG. 1;

FIG. 6 is a schematic diagram showing some components of the server of FIG. 1;

FIG. 7 is a schematic diagram showing functional modules of the root sequence determiner of FIGS. 2A-B; and FIG. 8 shows one example of a computer program product comprising computer readable means.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
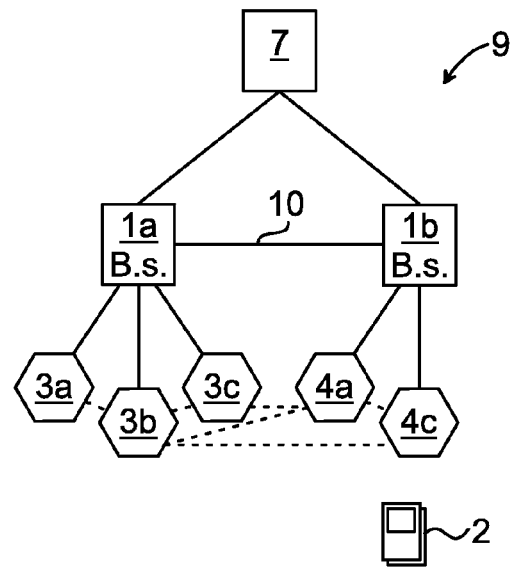
FIG. 1 is a schematic diagram illustrating an environment where embodiments presented herein can be applied.

FIG. 1 is a schematic diagram illustrating an environment where embodiments presented herein can be applied. In a mobile communication network 9 there are two base stations 1a-b shown. The mobile communication network 9 can comply with Long Term Evolution (LTE), standard of 3rd Generation Partnership Project (3GPP) or any other applicable standard. Hereinafter, references are on occasion made to messages according to LTE for completeness sake, but it is to be noted that this does not restrict the embodiments, which can be applied to any suitable standard.

The base stations 1a-b can be extended node Bs (eNBs) in an LTE system or equivalent nodes in other types of systems. While two base stations 1a-b are shown here, the mobile communication network 9 can comprise any number of suitable base stations. A first base station 1a is responsible for three cells 3a-3c and a second base station 1b is responsible for two cells 4a, 4c. While the number of cells of each base station here is illustrated as being two or three, it is to be noted that the number of cells of each base station can be any suitable number including one, two, three or more. The base stations 1a-b have a communication channel 10 between them. The communication link can for example be an X2 link in accordance with the LTE standards, using X2AP (X2 application protocol). A server 7 can be provided being in contact with each one of the base stations 1a-b.

The cell 4a of the second base station 1b has a reciprocal external neighbour relationship respectively with cells 3b, 3c of the first base station 1a. Moreover, the cell 4c of the second base station 1b has a reciprocal external neighbour relationship with the cell 3b of the first base station 1a. This implies that the first base station 1a and the second base station 1b are neighbouring base stations. It is sufficient that there is single external neighbour relationship between the cells of two base stations for the base stations to be considered neighbouring base stations. Additionally, the cell 3b of the first base station 1a has a reciprocal internal neighbour relationship with the cells 3a and 3c, and the cell 4a of the second base station 1b has a reciprocal internal neighbour relationship with the cell 4c.

It is to be noted that the cells are here shown slightly spaced apart for illustrational purposes. In reality, the cells can border each other properly or overlap.

One or more mobile communication terminals 2, also known as user equipment (UE), are shown, where each mobile communication terminal 2 is mobile between the cells of the base stations of the mobile communication network 9 to achieve connectivity with the mobile communication network 9.

Random Access Preambles

In EUTRA (evolved UMTS (Universal Mobile Telecommunications System) Terrestrial Radio Access Network), the air interface for LTE, a mobile communication terminal contacts the base station by a random access procedure starting with the mobile communication terminal sending a preamble on a resource block allocated to the Physical Random Access Channel (PRACH). This can occur at initial attach, when the mobile communication terminal connects, at handover, when the mobile communication terminal needs to be scheduled for uplink transmission or any other situation when the mobile communication terminal needs to establish a connection with a base station.

The preamble sequence consists of $N_{ZC}$ (for preamble format 0 $N_{ZC}$=839) complex values (y(0) . . . y($N_{ZC}$−1)), each corresponding to one symbol. This sequence is derived from a standardized set of 838 Zadoff-Chu (ZC) root sequences numbered 0 to 837. Each ZC root sequence can be cyclically shifted to obtain more valid preambles.

A cell allows 64 valid preambles with different random access preamble id (RAPID) ranging from 0 to 63. $N_{CS}$ is the shift size defined for the cell, which defines the valid preambles. For each cell, the first root sequence number and the shift size $N_{CS}$ is defined, and this information is available both for the mobile communication terminal (through broadcast) and the base station. The base station and the mobile communication terminal can then independently derive the sequence for each valid RAPID.

A cell can be a normal cell or a high-speed cell. In both cells, different preambles are designed by cyclically shifting root sequences, but the method for determining a shift is different for these kinds of cells.

Firstly, a normal cell will be described. The root-sequence ZC(u, 0), ZC(u, 1), ZC(u, 2) . . . ZC(u, 838), where u is the logical index of the root sequence, can be cyclically shifted with steps of $N_{CS}$ to produce different valid preambles. If, for example, $N_{CS}$ is 13, the following three sequences are all examples of valid sequences:

ZC(u, 0), ZC(u, 1), ZC(u, 2) . . . ZC(u, 838)

ZC(u,826), ZC(u,827) . . . ZC(u,838), ZC(u,0), ZC(u,1) . . . ZC(u,825)

ZC(u,813), ZC(u,814) . . . ZC(u,838), ZC(u,0), ZC(u,1) . . . ZC(u,812)

The value of $N_{CS}$ is selected depending on the random access cell size. The value of $N_{CS}$*TS (where TS is the time to send one random access symbol) shall be higher than the highest possible round-trip delay.

RAPID 0 corresponds to the first root sequence. RAPID 1 correspond to the first root sequence, shifted with $N_{CS}$, RAPID 2 correspond to the first root sequence, shifted with 2*$N_{CS}$, etc., until all possible shifts are used for the same sequence. To be able to supply all required sequences, the next set of sequences are then produced from next root sequence, until all 64 RAPID values are associated with a sequence.

Depending on the $N_{CS}$ value this means that up to 64 different root sequences are used. The higher $N_{CS}$ value, the more root sequences will be used. From each root sequence $n_v$=floor($N_{ZC}$/$N_{CS}$), preambles can be allocated, so the number of root sequences used up by a cell is roughly proportional to its radius.

The 3GPP standard specifies a limited set of allowed $N_{CS}$ values, defined as various zeroCorrelationZoneConfig identities, as shown in Table 1.

TABLE 1 zeroCorrelationZoneConfig-$N_{CS}$ mapping

| zeroCorrelationZoneConfig | $N_{CS}$ for Normal cells | $N_{CS}$ for High-Speed Cells |
|---|---|---|
| 0 | 0 | 15 |
| 1 | 13 | 18 |
| 2 | 15 | 22 |
| 3 | 18 | 26 |
| 4 | 22 | 32 |
| 5 | 26 | 38 |
| 6 | 32 | 46 |
| 7 | 38 | 55 |
| 8 | 46 | 68 |
| 9 | 59 | 82 |
| 10 | 76 | 100 |
| 11 | 93 | 128 |
| 12 | 119 | 158 |
| 13 | 167 | 202 |
| 14 | 279 | 237 |
| 15 | 419 | — |

Now root sequence usage for high speed cells will be described. For a high speed cell, a root-sequence ZC(u,0), ZC(u,1), ZC(u,2) . . . ZC(u,838), where u is the logical root sequence index, a number of valid preamble sequences can be generated. The number of valid sequences, $n_v$, can be determined from the root sequence index u, and the $N_{CS}$ of the cell. A sequence has a sequence index v between 0 and $n_v$−1. Each sequence is a cyclic shift of the root sequence by $C_v$ steps, where v is the index of the sequence. $C_v$ can be determined from u, v and $N_{CS}$.

Due to i.a. Doppler effect, there is a maximal $N_{CS}$, called $S_{max}$ for each u. If $N_{CS}$ is higher then $S_{max}$, then no preambles can be generated using this root sequence. Consequently, a root sequence with an $S_{max}$ less than $N_{CS}$ of the cell can not be used.

RAPID 0 corresponds to the first root sequence and v=0. RAPID 1 corresponds to the first root sequence, with v=1, RAPID 2 corresponds to the first root sequence, with v=2, etc., until all possible shifts are used, i.e. until all $n_v$ sequences are generated. Then the next set of pre-ambles is produced from the next root sequence (by logical index), until all 64 RAPID values are associated with a pre-amble.

In this way, the mobile communication terminal and the base station can derive the root sequence number and cyclic shift of each valid preamble using the formulas described in 3GPP TS 36.211 3rd Generation Partnership Project; Technical Specification Group Radio Access Network; Evolved Universal Terrestrial Radio Access (E-UTRA); Physical Channels and Modulation.

Furthermore, the logical root sequences have been grouped according to $S_{max}$, to ensure that consecutive root sequences can be used for cells with high $N_{CS}$. These groups are listed in Table 2.

For example, a high speed cell which is configured to have $N_{CS}$=32 can use the root sequences in groups 5 to 26, as these root sequences has an $S_{max}$ of 32 or higher. In other words, in contrast to normal cells, high speed cells are limited in what root sequences they can use, depending on the configured $N_{CS}$.

TABLE 2

$S_{max}$ of root sequence groups

| Group index | $S_{max}$ (High Speed) | Logical Index (u) |
|---|---|---|
| 0 | — | 0-23 |
| 1 | 15 | 24-29 |
| 2 | 18 | 30-35 |
| 3 | 22 | 36-41 |
| 4 | 26 | 42-51 |
| 5 | 32 | 52-63 |
| 6 | 38 | 64-75 |
| 7 | 46 | 76-89 |
| 8 | 55 | 90-115 |
| 9 | 68 | 116-135 |
| 10 | 82 | 136-167 |
| 11 | 100 | 168-203 |
| 12 | 128 | 204-263 |
| 13 | 158 | 264-327 |
| 14 | 202 | 328-383 |
| 15 | 237 | 384-455 |
| 16 | 237 | 456-513 |
| 17 | 202 | 514-561 |
| 18 | 158 | 562-629 |
| 19 | 128 | 630-659 |
| 20 | 100 | 660-707 |
| 21 | 82 | 708-729 |
| 22 | 68 | 730-751 |
| 23 | 55 | 752-765 |
| 24 | 46 | 766-777 |
| 25 | 38 | 778-789 |
| 26 | 32 | 790-795 |
| 27 | 26 | 796-803 |
| 28 | 22 | 804-809 |
| 29 | 18 | 810-815 |
| 30 | 15 | 816-819 |
| 31 | — | 820-837 |

Now the conventional allocation of root sequences will be described. Every cell has 64 different preambles allocated. Depending on the $N_{CS}$ value, this means that up to 64 (out of 838) different root sequences can be used for every cell.

If two neighbouring cells use the same frequency and same root sequences for random access, this will cause unnecessary random access load. For each random access procedure in one cell there is a risk that a false preamble is detected in the other. As the number of preambles that can be handled simultaneously in one cell is limited, this will affect random access performance, e.g. by increasing the average delay before the mobile communication terminal establishes communication with the cell. Also, each detected preamble will cause a Random Access Response, to be sent, increasing the risk of signalling congestion.

Because of this, it is desired that neighbouring cells do not use the same root sequences. This is conventionally done using manual configuration. In embodiments presented herein, this determination of root sequences for cells is performed in one or more root sequence determiners based on priorities. In the case of a detected conflict, it is thus clearly defined for all parties which one of the two cells in the conflict needs to find a new root sequence.

Figure 2A:
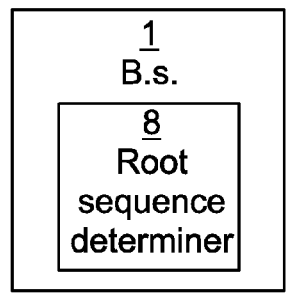
FIGS. 2A-B are schematic diagrams illustrating that the root sequence determiner can be implemented in a base station or server of FIG. 1.
Figure 2B:
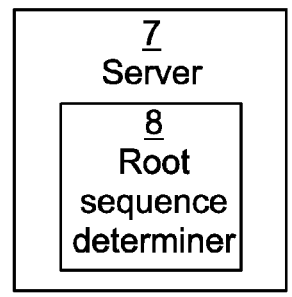

FIGS. 2A-B are schematic diagrams illustrating that the root sequence determiner 8 can be implemented in a base station 1 or server 7 of FIG. 1. The root sequence determiner 8 is a functional module. The module can be implemented using hardware and/or software such as a computer program executing in the base station 1, being either one of the two base stations 1a-b or the server 7 of FIG. 1. In FIG. 2A, the root sequence determiner 8 is shown as being part of a base station 1 and in FIG. 2B, the root sequence determiner 8 is shown as being part of the server 7. By being included in the server 7, the root sequence determiner 8 can be used to determine root sequences for several or all base stations of the mobile communication network 9.

Figure 3:
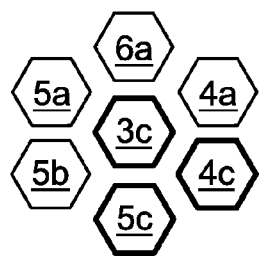
FIG. 3 is a schematic diagram illustrating two neighbouring cells with higher priority.

FIG. 3 is a schematic diagram illustrating two neighbouring cells with higher priority. In this situation, the root sequence determination is performed (as described in more detail below) for a cell 3c. Cells 4a,c, 5a-c and 6a are all neighbouring cells to cell 3c, which for a controlling base station can be called an internal cell. It is here detected that the internal cell 3c is in conflict with two neighbouring cells, a first external cell 4c, and a second external cell 5c. Assuming that the first external cell 4c has the highest priority, followed by the second external cell 5c and finally the internal cell 3c, the internal cell 3c clearly needs to find a new root sequence. However, the internal cell 3c may find a new root sequence that later proves to be in conflict with a new root sequence assumed by the second neighbouring external cell 5c. Hence, by delaying root sequence allocation for the internal cell 3c until the second external neighbouring cell 5c has assumed a new root sequence, the internal cell 3c can in some instances avoid having to change root sequences twice. This situation is described in more detail below with reference to flow chart 4B.

Figure 4A:
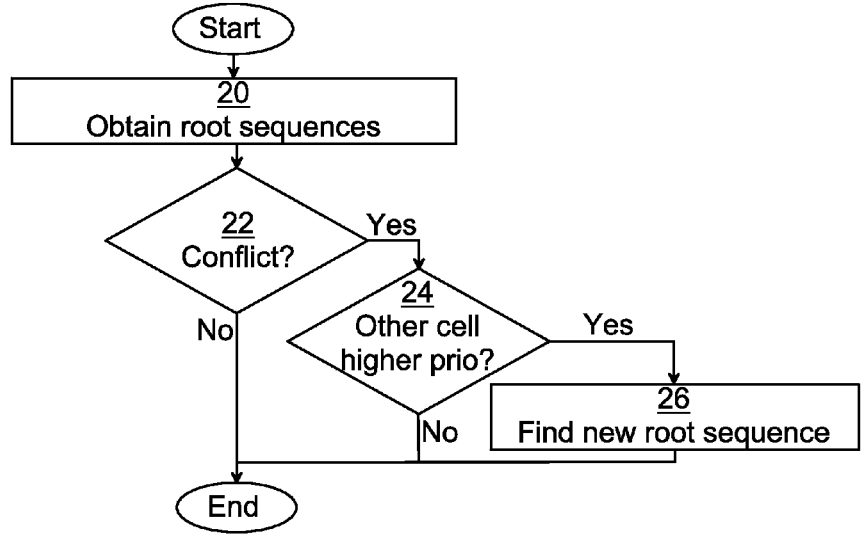
FIGS. 4A-B are flow charts illustrating methods performed in the root sequence determiner of FIGS. 2A-B.

FIG. 4A is a flow chart illustrating a method performed in the root sequence determiner of FIGS. 2A-B. The method is performed for a first cell being controlled by a base station.

In an initial obtain root sequences step 20, the root sequence determiner obtains root sequences for neighbouring cells. For cells being controlled by external base stations, this can e.g. be obtained from an ENB CONFIGURATION UPDATE message for the neighbouring cells in question.

In a conditional conflict step 22, it is evaluated whether there is a root sequence conflict found between the two cells of the first cell and a neighbouring cell, here denoted a conflict cell. A conflict is determined when there is overlapping root sequence usage (at least one root sequence is used by both cells) and that both cells overlap or are identical in frequency usage. If there is a conflict, the method continues to a conditional other cell higher priority step 24. Otherwise, the method ends.

In the conditional other cell higher priority step 24, it is determined if the conflict cell is of a higher priority than the first cell. The priorities of the first cell and the conflict cell are based on properties of the respective cells.

The priority can be determined using a number of different parameters in order.

Initially, cell type (high speed cell/normal speed cell) is used to determine priority. In particular, a high speed cell gives a higher priority than a normal speed cell. The reason for this is that, due to $S_{max}$ as explained above, high speed cells often have a more narrow selection of possible root sequences to use, depending on the $N_{CS}$ configuration of the cell. Since the normal speed cell does not have these restrictions, it is often easier for the normal speed cell to find appropriate new root sequences, whereby a normal speed cell has lower priority than a high speed cell.

If both cells are of the same cell type, a cell with a higher value ($N_{CS}$) of cyclic shift between valid preambles is of higher priority than a cell with a lower value of cyclic shift between valid preambles. Again this is due to how easy or difficult it is to find a new root sequence. A cell with higher $N_{CS}$ will need more consecutive root sequences than a cell with lower $N_{CS}$. Hence, the high $N_{CS}$ cell is given a higher priority.

If both cells are of the same cell type and have the same $N_{CS}$ value, the cell with the oldest configuration for cell type and $N_{CS}$ is given higher priority. This is due to stability, allowing cells with older configuration to keep their root sequences while newer cells are given the task to find new root sequences.

If both cells are of the came cell type, have the same $N_{CS}$ value and have configuration of cell type and $N_{CS}$ of the same date and time, cell identifiers, such as CGI (Cell Global Identity), are used as a decisive parameter. Since CGI is globally unique for every cell, it is unambiguous which one of two CGI values is larger or smaller. It is not important whether the larger or smaller CGI value is used to determine the cell with the higher priority, as long the same method is used within the same network.

Using the described multistage priority comparison, any interested entity can thus unambiguously determine which one of two cells has the higher priority. When the conflict cell is of a higher priority than the first cell, the method continues to a find new root sequence step 26. Otherwise the method ends.

In the find new root sequence step 26, one or more (the number depending on $N_{CS}$ for the first cell as explained above) new root sequence is found for the first cell, while avoiding the root sequences of the neighbouring cells (both external and internal to the same base station). After this step, the method ends.

Figure 4B:
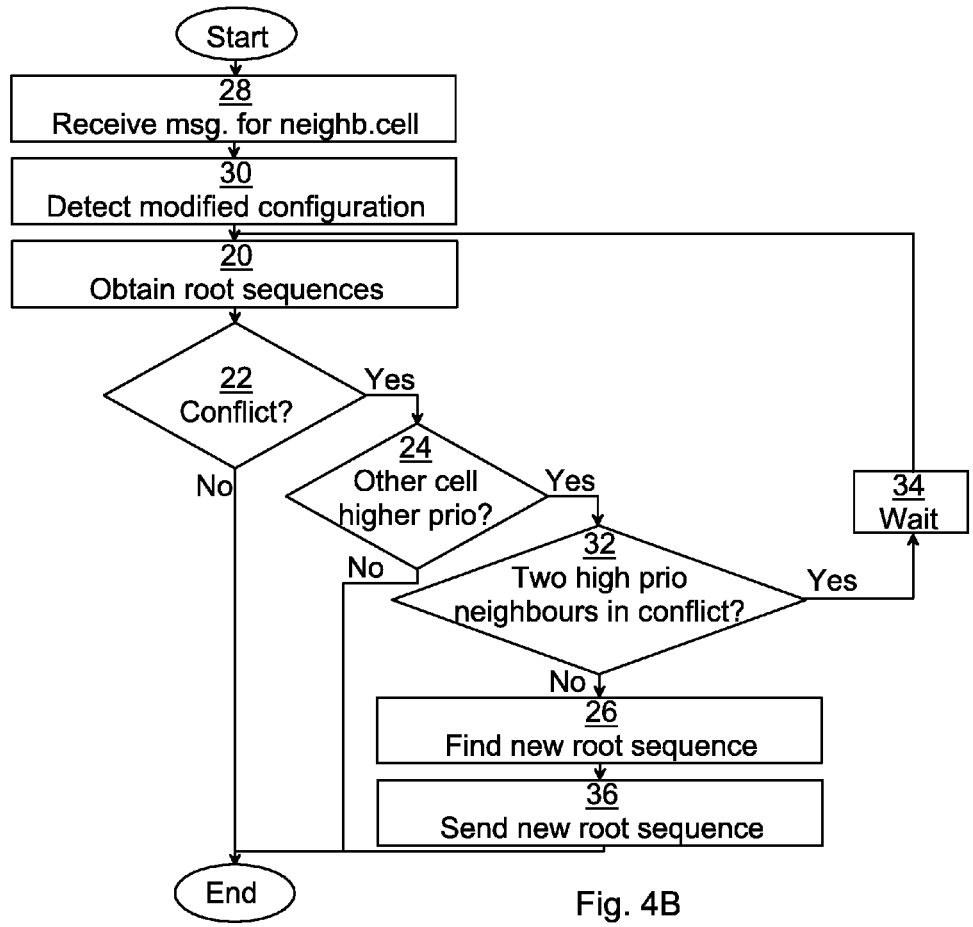

FIG. 4B is a flow chart illustrating a more elaborate method performed in the root sequence determiner of FIGS. 2A-B. All steps of the method disclosed in FIG. 4A are also present in the method of FIG. 4B and will not be described again.

In an initial optional receive message for neighbouring cell step 28, a message is received indicating a modified random access configuration of any neighbouring cell. This can for example be a message of type ENB CONFIGURATION UPDATE. This message comprises a high speed flag (indicating high speed or normal speed cell), $N_{CS}$ (or more accurately zeroCorrelationZoneConfig which together with the high speed flag gives $N_{CS}$, see table 1) and the logical index of the root sequence (u above).

In an optional detect modified configuration step 30, a modified configuration of the first cell is detected. This configuration modification can be due to manual or rule based automatic modification.

This step 30 and the previous step 28 can be trigger steps to start the method, i.e. they do not need to be performed in sequence and both steps 28, 30 do not need to be performed; it is sufficient if one of the steps 28, 30 is performed to start the method.

In contrast to the method of FIG. 4A, if it is found that the conflict cell is of a higher priority than the first cell, the process continues to a conditional two high priority neighbours in conflict step 32.

In the conditional two high priority neighbours in conflict step 32, it is determined whether two neighbouring cells are in conflict. This can be checked using the same parameters used in the conditional conflict step 22, but for two neighbouring cells. Moreover, in order for this determination to be positive, both neighbouring cells need to be of higher priority than the first cell, determined in the same way for both cells like in the conditional other cell higher priority step 24. If it is found that two high priority neighbours are in conflict, the method continues to a wait step 34. Otherwise, the method continues to the find new root sequence step 26.

In the wait step 34, in line with the explanation with reference to FIG. 3 above, the root sequence determiner waits for the lower priority of the two high priority neighbours to find one or more new root sequences. This wait can for example be implemented by waiting until a message is received indicating that the lower priority one of the two neighbouring cells has found a new root sequence. Alternatively, or additionally as a fall-back in case no message is received, the wait can occur for a predetermined duration. After the wait step 34, the method continues to the obtain root sequences step 20.

After the find new root sequence step 26, the method continues to a send new root sequence step 36. In this step 36, the new root sequence or root sequences are communicated to neighbouring base stations, e.g. using an ENB CONFIGURATION UPDATE message.

FIG. 5 is a schematic diagram showing some components of a base station 1 such as any one of the base stations 1a-b of FIG. 1. A controller 50 is provided using any suitable central processing unit (CPU), microcontroller, digital signal processor (DSP), application specific integrated circuit etc., capable of executing software instructions stored in a computer program product 54, e.g. in the form of a memory. The computer program product 54 can be a memory or any combination of read and write memory (RAM) and read only memory (ROM). The memory also comprises persistent storage, which, for example, can be any single one or combination of magnetic memory, optical memory, solid state memory or even remotely mounted memory.

The base station 1 also comprises an I/O interface 57 for communicating with other elements of the mobile communication network such as other base stations or the server 7.

The I/O interface 57 implements a communication interface unit and is responsible for the lower layers of the interface such as physical, link and network layer implementation of one or more internet protocol (IP) interfaces towards operation and maintenance, evolved packet core, and other base stations. The controller, or control unit, 50 implements higher protocol layers and other control, such as management of the X2AP interface to other base stations.

The base station 1 also comprises one or more transceivers 55 and a corresponding number of antennas 52 for radio communication with mobile communication terminals.

Using other terminology, the antenna 52 and the transceiver 55 can implement a radio unit and a baseband unit. The radio unit is responsible for managing transmission and reception of radio frequency (RF) signals with mobile communication terminals. The baseband unit is responsible for modulation and demodulation of physical and low level channels, and can e.g. detect preambles.

FIG. 6 is a schematic diagram showing some components of the server 7 of FIG. 1. A controller 90 is provided using any suitable central processing unit (CPU), microcontroller, digital signal processor (DSP), capable of executing software instructions stored in a computer program product 94, e.g. in the form of a memory. The computer program product 94 can be a memory or any combination of read and write memory (RAM) and read only memory (ROM). The memory also comprises persistent storage, which, for example, can be any single one or combination of magnetic memory, optical memory, or solid state memory or even remotely mounted memory.

The server 7 also comprises an I/O interface 92 for communicating with other elements of the mobile communication network such as the base stations.

FIG. 7 is a schematic diagram showing functional modules of the root sequence determiner of FIGS. 2A-B. The modules can be implemented using hardware and/or software such as a computer program executing in the base station 1 or the server 7. All modules depend on an execution environment (not shown) which utilises the components shown in FIGS. 5 and 6 respectively. The modules correspond to steps of the method illustrated in FIGS. 4A-B.

A root sequence obtainer 60 is arranged to obtain root sequences of neighbouring cells.

A priority determiner 62 is arranged to, when a root sequence conflict is found between the first cell and a neighbouring cell, called a conflict cell, determine if the conflict cell is of a higher priority than the first cell.

A root sequence allocator 64 is arranged to, when the conflict cell is of a higher priority than the first cell, find a new root sequence for the first cell, while avoiding any root sequences of the conflict cell, and any other neighbouring cells (both external and internal).

A neighbouring configuration receiver 66 is arranged to receive configuration for random access from neighbouring base stations. This can be received over the communication channel 10 (FIG. 1) between the base stations. This module corresponds to step 28 of FIG. 4B.

An internal configuration detector 67 is arranged to detect a modified random access configuration of the first cell, corresponding to step 30 of FIG. 4B.

A neighbouring high priority cell conflict detector 68 is arranged to determine when two neighbouring cells both are of a higher priority than the first cell and there is a root sequence conflict between two neighbouring cells. This module corresponds to step 32 of FIG. 4B.

FIG. 8 shows one example of a computer program product 70 comprising computer readable means. On this computer readable means a computer program 71 can be stored, which computer program 71 can cause a controller to execute a method according to embodiments described herein. In this example, the computer program product is an optical disc, such as a CD (compact disc) or a DVD (digital versatile disc) or a Blu-Ray disc. As explained above, the computer program product could also be embodied as a memory of a device, such as memory 54 of the base station 2 or memory 94 of the server 7. While the computer program 71 is here schematically shown as a track on the depicted optical disk, the computer program can be stored in any way which is suitable for the computer program product.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method, executed in a root sequence determiner for a base station controlling a first cell, the first cell associated with at least one root sequence used for cell differentiation on a random access channel, the method comprising:

obtaining information on root sequences of neighboring cells, the neighboring cells neighboring the first cell;

in response to finding a root sequence conflict between the first cell and a neighboring cell, the neighboring cell having the root sequence conflict denoted as a conflict cell, determining if the conflict cell is of a higher priority than the first cell, the priorities of the first cell and the conflict cell being based on properties of the respective cells, wherein the method comprises finding a root sequence conflict whether the first cell and the neighboring cell are cells served by the same base station or different base stations; and in response to the conflict cell being of a higher priority than the first cell, finding a new root sequence for the first cell that avoids any root sequences of the neighboring cells.

2. The method of claim 1, wherein a root sequence conflict is present when any overlap exists between the at least one root sequence of the first cell and root sequences of the neighboring cells to be used on overlapping frequencies.

3. The method of claim 1, wherein in the determining if the conflict cell is of a higher priority than the first cell, a high speed cell is of higher priority than a normal speed cell.

4. The method of claim 3, wherein in the determining if the conflict cell is of a higher priority than the first cell, if priority between the first cell and the conflict cell is otherwise undetermined, a cell that assumed a high speed configuration earlier is of higher priority than a cell that assumed a high speed configuration later.

5. The method of claim 3, wherein in the determining if the conflict cell is of a higher priority than the first cell, if priority between the first cell and the conflict cell is otherwise undetermined, a cell with a higher value of cyclic shift between valid preambles is of higher priority than a cell with a lower value of cyclic shift between valid preambles.

6. The method of claim 5, wherein in the determining if the conflict cell is of a higher priority than the first cell, if priority between the first cell and the conflict cell is otherwise undetermined, a cell that assumed a value of cyclic shift between valid preambles earlier is of higher priority than a cell that assumed a value of cyclic shift between valid preambles later.

7. The method of claim 3, wherein in the determining if the conflict cell is of a higher priority than the first cell, if priority between the first cell and the conflict cell is otherwise undetermined, respective cell identifier values are used to determine which one of the first cell and the conflict cell is of higher priority.

8. The method of claim 1, further comprising, prior to the obtaining information on root sequences, receiving a message indicating a modified configuration of any neighboring cell.

9. The method of claim 1, further comprising, prior to the obtaining information on root sequences, detecting a modified configuration of the first cell.

10. The method of claim 1, wherein the conflict cell is controlled by another base station than the base station controlling the first cell.

11. The method of claim 1, wherein the conflict cell is controlled by the base station controlling the first cell.

12. The method of claim 1, further comprising, when a new root sequence has been found for the first cell, sending a message indicating the new root sequence for the first cell to neighboring base stations that are controlling neighboring cells.

13. The method of claim 1, further comprising, prior to the finding the new root sequence for the first cell, in response to determining that two neighboring cells both are of a higher priority than the first cell and there is a root sequence conflict between two neighboring cells, waiting a predetermined duration until the finding of the new root sequence for the first cell is performed.

14. The method of claim 1, further comprising, prior to the finding the new root sequence for the first cell, in response to determining that two neighboring cells both are of a higher priority than the first cell and there is a root sequence conflict between two neighboring cells, waiting until a message is received indicating that one of the two neighboring cells has found a new root sequence.

15. The method of claim 1:
    wherein the method is executed for a plurality of cells of the base station; and
    wherein, in the finding the new root sequence for the first cell, all root sequences of other cells of the base station are avoided.

16. The method of claim 1, wherein the root sequence determiner is a portion of the base station.

17. The method of claim 1, wherein the root sequence determiner is in a server for a plurality of base stations.

18. A root sequence determiner configured to determine a root sequence for a first cell controlled by a processed base station, the root sequence being used for cell differentiation on a random access channel, the root sequence determiner comprising:
    one or more processing circuits configured to function as:
        a root sequence obtainer circuit configured to obtain root sequences of neighboring cells, the neighboring cells neighboring the first cell;
        a priority determiner circuit configured to, in response to finding a root sequence conflict between the first cell and a neighboring cell, the neighboring cell having the root sequence conflict denoted as a conflict cell, determine if the conflict cell is of a higher priority than the first cell, wherein the priority determiner circuit is configured to find a root sequence conflict between cells served by the same base station, and find a root sequence conflict between cells served by different base stations; and
        a root sequence allocator circuit configured to, in response to the conflict cell being of a higher priority than the first cell, find a new root sequence for the first cell that avoids any root sequences of the conflict cell.

19. The root sequence determiner of claim 18, wherein the root sequence determiner is a portion of the processed base station.

20. The root sequence determiner of claim 18:
    wherein the root sequence determiner is a portion of a server; and
    wherein the server is configured to determine root sequences for a plurality of respective processed base stations of a mobile communication network.

21. A computer program product stored in a non-transitory computer readable medium for determining a root sequence in a root sequence determiner for a base station controlling a first cell, the first cell associated with at least one root sequence used for cell differentiation on a random access channel, the computer program product comprising software instructions which, when run on one or more processing circuits of the root sequence determiner, causes the root sequence determiner to:
    obtain information on root sequences with neighboring cells, the neighboring cells neighboring the first cell;
    in response to finding a root sequence conflict between the first cell and a neighboring cell, the neighboring cell having the root sequence conflict denoted as a conflict cell, determine if the conflict cell is of a higher priority than the first cell, the priorities of the first cell and the conflict cell being based on properties of the respective cells; and
    in response to the conflict cell being of a higher priority than the first cell, find a new root sequence for the first cell that avoids any root sequences of the neighboring cells; and
    wherein the computer program product comprises software instructions, which when run on one or more processing circuits of the root sequence determiner causes the root sequence determiner to find a root sequence conflict whether the first cell and the neighboring cell are cells served by the same base station or different base stations.

22. The method of claim 1, wherein the neighboring cells comprise neighboring cells served by the same base station as the first cell, and wherein finding a new root sequence comprises finding a new root sequence that avoids any root sequences of a neighboring cell that is served by the same base station as the first cell.

23. The method of claim 1, wherein the properties of the respective cells indicate the root sequences that can be used in each cell in the absence of any conflict amongst conflicting cells.

* * * * *